(12) United States Patent
Huitema et al.

(10) Patent No.: US 8,866,800 B2
(45) Date of Patent: Oct. 21, 2014

(54) STACKED DISPLAY WITH A BENDED SUBSTRATE, AN ELECTRONIC APPARATUS AND A METHOD FOR MANUFACTURING THE SAME

(75) Inventors: Hjalmar Edzer Ayco Huitema, Eindhoven (NL); Petrus Johannes Gerardus van Lieshout, Eindhoven (NL); Erik van Veenendaal, Eindhoven (NL)

(73) Assignee: Creator Technology B.V., Breda (NL)

( * ) Notice: Subject to any disclaimer, the term of this patent is extended or adjusted under 35 U.S.C. 154(b) by 920 days.

(21) Appl. No.: 12/993,726

(22) PCT Filed: May 22, 2009

(86) PCT No.: PCT/NL2009/050279
§ 371 (c)(1),
(2), (4) Date: Feb. 10, 2011

(87) PCT Pub. No.: WO2009/142496
PCT Pub. Date: Nov. 26, 2009

(65) Prior Publication Data
US 2011/0128260 A1    Jun. 2, 2011

Related U.S. Application Data

(60) Provisional application No. 61/055,349, filed on May 22, 2008.

(51) Int. Cl.
| | | |
|---|---|---|
| G06F 3/038 | (2013.01) | |
| G09G 5/00 | (2006.01) | |
| G09G 3/38 | (2006.01) | |
| G02F 1/1339 | (2006.01) | |
| H05K 3/30 | (2006.01) | |
| G02F 1/1347 | (2006.01) | |
| G02F 1/1333 | (2006.01) | |
| G02B 26/00 | (2006.01) | |
| G02F 1/137 | (2006.01) | |
| G02B 5/20 | (2006.01) | |
| G02B 5/30 | (2006.01) | |

(52) U.S. Cl.
CPC ........ *G02F 1/133305* (2013.01); *G02B 26/004* (2013.01); *G02F 1/13718* (2013.01); *G02F 1/13473* (2013.01); *G02B 5/201* (2013.01); *G02B 5/3016* (2013.01); *G02B 26/005* (2013.01)
USPC .............. 345/204; 345/1.3; 345/98; 349/155; 29/832

(58) Field of Classification Search
CPC .................................... G02F 1/133305
USPC ............... 345/98, 156, 173, 87, 1.3; 359/512, 359/603, 318; 428/1.3; 356/401; 349/155, 349/135, 139, 158; 40/603; 365/145, 365/185.05; 29/832
See application file for complete search history.

(56) References Cited

U.S. PATENT DOCUMENTS

| 4,597,635 A | 7/1986 | Hoshikawa | |
| 6,600,467 B1 * | 7/2003 | Webb | 345/87 |

(Continued)

FOREIGN PATENT DOCUMENTS

| WO | WO 2005/015302 | 2/2005 |
| WO | WO 2007/069187 | 6/2007 |

OTHER PUBLICATIONS

International Search Report dated Aug. 6, 2009 for PCT/NL2009/050279.

*Primary Examiner* — Quan-Zhen Wang
*Assistant Examiner* — Lin Li

(57) ABSTRACT

A stacked display (20b) comprises superposed regions for changing between a reflective color state (R, G, B) and a transparent state, which regions form part of a~bended substrate (20). The substrate (20) may comprise a sequence of portions (1-6) which forms regions having pre-defined color. Each portion (1-6) is electrically connected to a further portion in the sequence by interconnect regions (b', c', d') which form an oversized loop between the regions (1-2, 3-4, 5-6) when the substrate (20) is bent. The regions (1-2, 3-4, 5-6) are filled with a suitable optoelectronic color material (R, G, B).

30 Claims, 12 Drawing Sheets

(56) References Cited

U.S. PATENT DOCUMENTS

| | | |
|---|---|---|
| 6,697,039 B1 * | 2/2004 | Yamakawa et al. ............. 345/98 |
| 6,697,697 B2 | 2/2004 | Conchieri et al. |
| 2001/0005256 A1 * | 6/2001 | Sumi et al. .................... 349/158 |
| 2002/0027636 A1 * | 3/2002 | Yamada ........................ 349/155 |
| 2002/0029504 A1 * | 3/2002 | Lowndes ........................ 40/603 |
| 2004/0114143 A1 * | 6/2004 | Van Haren et al. ........... 356/401 |
| 2005/0151709 A1 | 7/2005 | Jacobson et al. |
| 2007/0064188 A1 * | 3/2007 | Okamoto ...................... 349/135 |
| 2007/0211036 A1 * | 9/2007 | Perkins ........................ 345/173 |
| 2008/0148559 A1 * | 6/2008 | Nickerson et al. .............. 29/832 |
| 2008/0239225 A1 * | 10/2008 | Chen et al. .................... 349/139 |
| 2009/0033587 A1 * | 2/2009 | Fricke et al. ................... 345/1.3 |
| 2009/0136688 A1 * | 5/2009 | Wang et al. .................... 428/1.3 |

* cited by examiner

STACKED DISPLAY WITH A BENDED SUBSTRATE, AN ELECTRONIC APPARATUS AND A METHOD FOR MANUFACTURING THE SAME

FIELD

The invention relates to a stacked display. In particular, the invention relates to a cholesteric liquid crystal (CLC) display, electrowetting display or a stack display combining any two or more display technologies, wherein a display layer may be alternated between a color state and a transmissive state. The invention further relates to a method of manufacturing a stack display. The invention further relates to an electronic apparatus comprising a stack display.

BACKGROUND

An embodiment of a stack color display is known from US2002/0135719 A1, which operates using a cholesteric liquid crystal (CLC) principle. The known CLC display comprises first and second substrates facing and being spaced apart from each other. Beneath the first substrate a first transparent electrode is positioned, whereas a light absorbing layer is positioned on a second substrate. A CLC color filter layer is positioned on the light absorption layer, which comprises a multi-layer structure, each layer including sub-color filters for red, green and blue colors, which are arranged in the alternating order. A second transparent electrode is positioned on the CLC color filter layer.

SUMMARY OF THE INVENTION

It is a disadvantage of the known stack color display that a great plurality of pixels have to be matched optically and geometrically. In particular, for active-matrix stacked color displays alignment problems constitute a substantial handicap, as every pixel of a given primary color in the panel needs to be matched correctly with the two pixels of the complementary primary colors at the same position in the stack. More in particular, it is a disadvantage of the known stack display that a number of interconnect problems persist when stacking a number of display layers on top of each other.

It is an object of the invention to provide a stack display wherein interconnect problems are relieved. It is a further object of the invention to provide a stack display wherein alignment problems between different display layers forming the stack are substantially mitigated.

To this end a stack display according to the invention comprises superposed regions conceived to be alternated between at least a first substantially reflective color state and a second substantially transparent state, wherein said regions form part of at least one bended substrate.

It is found that the problem of interconnecting different display layers forming the stack is solved when two or more regions conceived to operate as different layers of the display stack are manufactured on a mutual substrate. Thus, suitable interconnect regions are integrated into the substrate so that two or more layers of the stack are already interconnected prior to forming the display stack.

It is further found that alignment problem is substantially solved by providing a stack display wherein the stack of superposed regions is provided over substantially the whole area of the display, wherein each region can be controlled to alternate between a reflective color state and a substantially transparent state. Preferably, the regions form part of a single substrate. For example, the regions may be arranged to reflect suitable primary colors, like red green and blue may be used. In accordance with the invention a substrate is suitably deformed, in particular, bent, for forming said stack. In an embodiment of the stack display comprising a stack of three primary colors, the substrate may comprise a sequence of six portions 1-6 which may be bent in such a way that portions 1-2, 3-4, 5-6 cooperate together and thereby form cavities which can be filled with suitable respective materials for enabling red, green or blue display effect color. The regions formed by the portions 1-2, 3-4 and 5-6 may be interconnected by a build-in electrical interconnect layer positioned in a bending zone between the portions. This embodiment is further discussed with reference to FIG. 2.

Such configuration has an advantage that the requirements regarding pixel alignment are relaxed. In addition due to the fact that the respective regions form part of the single substrate, respective backplanes may be processed simultaneously simplifying the manufacturing process. It is noted that the stack display according to the invention may relate to either segmented, passive matrix or active-matrix stacked display. In addition, it will be appreciated that the stacked display according to the invention may relate to a CLC display, or electrowetting display. It is also possible to use a suitable combination of a bottom LCD or OLED layer with electrowetting or CLC. This embodiment is based on the understanding that a bottom layer in a display stack does not have to be substantially fully transparent, so that an LCD or OLED bottom layer may be suitable for manufacturing a stack display according to the invention. It will be appreciated that in this case that a stack display may comprise stack layers having different display technology.

Liquid crystal and electrowetting displays are known per se. A cholesteric (chiral nematic N*) liquid crystal (CLC) material typically contains nematic molecules possessing a chiral centre (i.e. molecules in which there is an asymmetric centre). This generates intermolecular forces that favour molecular alignment with a small angle relative to one another (i.e. spontaneous helical twisting). Nematic materials are racemic mixtures, containing equal quantities of enantiomers and can be considered as being a special case of the cholesteric material, which has an excess of one enantiomer. This leads to the formation of a spontaneous twisting helical structure without the necessary external boundary conditions imposed by the alignment layers present in a TN cell. An important parameter of the cholesteric phase is the pitch, p, defined as being the distance for the director to rotate through 360°. The pitch depends upon the geometry of the chiral molecules and decreases with increasing temperature.

A consequence of the spontaneous helical stacking structure in a cholesteric material is the selective reflection of light that is circularly polarised with the same sense of rotation as the helical pitch. Light that is circularly polarised in the opposite sense passes through unaffected.

The reflected wavelength from an unperturbed twisting helical structure depends upon the pitch, p, given by the formula $l=\underline{n}p$. Here, $\underline{n}=(n_o+n_1)/2$ and is the average refractive index of the CLC material. The bandwidth of the reflection peak from a cholesteric material is given by $Dl=Dn.p$.

Cholesteric materials may appear highly coloured due to the narrow band of wavelengths that are selectively reflected. The temperature dependence of the pitch may result in an alteration of the wavelength of reflected light. For example, an increase in temperature shortens the pitch and the reflected wavelengths move towards the blue end of the visible spectrum. The cholesteric LC molecules may be micro-encapsulated to form a suspension of droplets encapsulated in the regions of the color display.

The wavelength of reflected light can be controlled by adjusting the chemical composition of the cholesteric material, which in turn controls the pitch of the helical structure. Cholesterics can either consist exclusively of chiral molecules, or of nematic molecules together with a chiral dopant (excess of one isomer). In this case, the dopant concentration can be used to adjust the chirality and hence the pitch of the cholesteric material. Suitable states of a CLC material for enabling a color display according to the invention will be explained with reference to FIG. 1.

It will be appreciated that a plurality of per se known technologies may be used for enabling alternation between the color reflective state and the transparent state. In particular, said alternation may be enabled using electrowetting principle, wherein, for example, a suitable colored oil may controllably be displaced within each region for forming either a colored region or a transparent, i.e. color-less region. It will be further appreciated that the term colored region also relates to a situation when a region is partially filled with a colored medium. It will further be appreciated that the term 'color' next to relates to any suitable color also contemplates a grey color. The term 'transparent' relates to a feature of a layer to not substantially alter an intensity of light propagating trough this layer. It will further be appreciated that the stack display according to invention may have two or more superposed regions. A number of superposed regions may be as high as 4 to 6, or even higher.

In an embodiment of the stack display according to the invention the substrate comprises interconnect regions dimensioned and arranged between said regions to allow forming of respective oversized loops upon folding of the substrate for superposing said regions.

It is found to be advantageous for arranging the thus formed stack of regions with oversized loops in between. For example, for the substrate an ultra-thin plastic layer may be selected. In this case cross-sections of the loops may be at least 10 times larger than cross-sections of said regions. For example, a thickness of a region may be as much as 0.1 mm, whereas a diameter of a loop may be about 4 mm.

In case when the stack display operates according to the active-matrix driving scheme, the substrate may comprise a sequence comprising an active matrix backplane followed by a common backplane.

In this case upon folding of the substrate the active matrix backplane and the common backplane face each other and thereby define a cell of a suitable primary color. Preferably, the substrate is folded in one plane in a snake-like fashion. However, the substrate may be suitably cut and be folded in more than one plane, for example in two planes. In any case in the stack display according to the invention the superposed regions comprise respective cells filled with a corresponding pre-defined display effect color material.

In an embodiment of the stack display according to the invention the cells may be fabricated prior to bending of the substrate.

This embodiment may have advantage with regard to the optimization of the display manufacturing process as it might be more convenient first to fill the cells with the suitable display effect optoelectronic material and then to bend or to at least partially cut and bend the substrate. In addition, it will be appreciated that such cells extend along substantially the whole cross-section of the display. In case of a narrow elongated display it may be not convenient to fill the cells when the display is already bent leaving just frontal narrow area available for filling. On the contrary, when the substrate is still flat, an elongated side area may be used for filling the cells.

In a still further embodiment of the stack display according to the invention, the display may be formed by two vertically interleaved bended substrates, wherein an end portion of a first bended substrate is received by a bended second substrate.

This embodiment presents a suitable alternative wherein the regions of the display effect colors are formed by cooperating portion of the first and the second substrate. This embodiment has an advantage than the radius of the loops may be increased leading to a reduced material stress in the bending region and the electronics layers of the bending region.

In a further embodiment of the stack display according to the invention the loops may be provided with a stiffener.

It is found to be advantageous to arrange a suitable stiffener, like an arc, a ball, a ring, a cylinder of a suitable flexible material, or any other convenient shape, into the loops. Due to this feature the durability of the display is increased.

In a further embodiment of the stack display according to the invention, integrated circuits (IC's) of an active matrix for driving display pixels are shared between the regions.

Due to this feature interconnect of the display electronics to the outside world becomes easier. This is particularly so when all element of the substrate are interconnected using the interconnect electrode layer. It will be appreciated that when the interconnect region is positioned in the oversized loop between the display stack layers, interconnecting is relaxed and has a well-defined and easy to reach position for enabling electrical connection of the stacked display to the outside world. On the contrary, a stacked display as known from the art, having a stack of 6 layers, each being arranged on a different height in the stack, has a disadvantage that the interconnect has to be arranged between these different heights, which is inherently costly and unreliable.

In a still further embodiment of the stack display according to the invention electrodes of a head end of the substrate is electrically connected to corresponding electrodes of a tail end of the substrate.

This embodiment has an advantage that electrical connection of the display electronics to the outside world is further simplified.

In a still further embodiment of the stack display according to the invention the display is flexible. The stack display may be arranged to be rollable for enabling suitable collapsing and expanding thereof. A wide range of thin flexible plastic is available to the person skilled in the art for manufacturing the flexible and, supplementary, rollable display. Preferably, the flexible, or rollable display makes part of the electronic apparatus, for example an organizer, a computer, a mobile phone or the like.

In a further embodiment of the stack display according to the invention either a leading portion of the rollable display or a trailing portion of the rollable display, or both, are stiffened.

For example, a suitable area may be stiffened by adding drivers in that region. In particular, a stiffened area may comprise the head end of the substrate electrically connected to the tail end of the substrate and/or the loops, as discussed with reference to the foregoing.

In a still further embodiment of the stack display according to the invention, the loops may be received in a body conceived to enable a rolling displacement of at least a portion of the display.

In accordance with this feature a rolling function of the display is simplified because the loops do not obstruct a substantially smooth rolling movement of the display and do not cause damage to the material of the stack. In a further embodiment of the display according to the invention a radius of the body may be substantially equal to diameter of the loops. In this way the loops fit well into an inner volume of the body and roll well together with the regions upon rolling.

In a still further embodiment of the stack display according to the invention, regions of the substrate conceived to form oversized loops extend over a portion of a cross-section of the substrate so that when the display is stacked the loops being formed on the same side of the stack fall substantially in line.

This embodiment has an advantage that the oversized loops are not stacked on top of each other but form a suitable sequence on each side of the substrate. This ensures that damage of interconnect regions is prevented and that an overall size of the display stack is minimized. This embodiment is explained in further detail with reference to FIG. 9.

In a still further embodiment of the stack display according the invention the substrate comprises markers for enabling alignment of the regions having a pre-defined display effect material.

It is found to be advantageous to provide radiation transmissive markers for enabling due alignment of the stack during a manufacturing step of the stack display according to the invention. Preferably, the marker comprises a light transparent region which may be suitably detected in a light transmission set-up. More preferable, each said region comprises at least one said marker. By matching two markers, each on one of the regions to be aligned, the alignment accuracy is substantially improved.

A method for manufacturing a stack display according to the invention comprises the steps of:
  forming a substrate with a sequence of portions for forming superposed regions conceived to be alternated between at least a first substantially reflective color state and a second substantially transparent state, said portion being electrically interconnected;
  bending the substrate for forming said superposed regions.

The invention still further relates to an electronic apparatus comprising the stack display as is discussed in the foregoing.

These and other aspects of the invention will be further discussed with reference to drawings wherein like reference signs relate to like elements. It will be appreciated that the drawings are used for illustrative purposes only and may not be used for limiting the scope of the appended claims. Although herein below presented embodiments relate to a CLC display, use of another display effect technology or a combination of different display effect technologies is contemplated.

DETAILED DESCRIPTION

Figure 1:
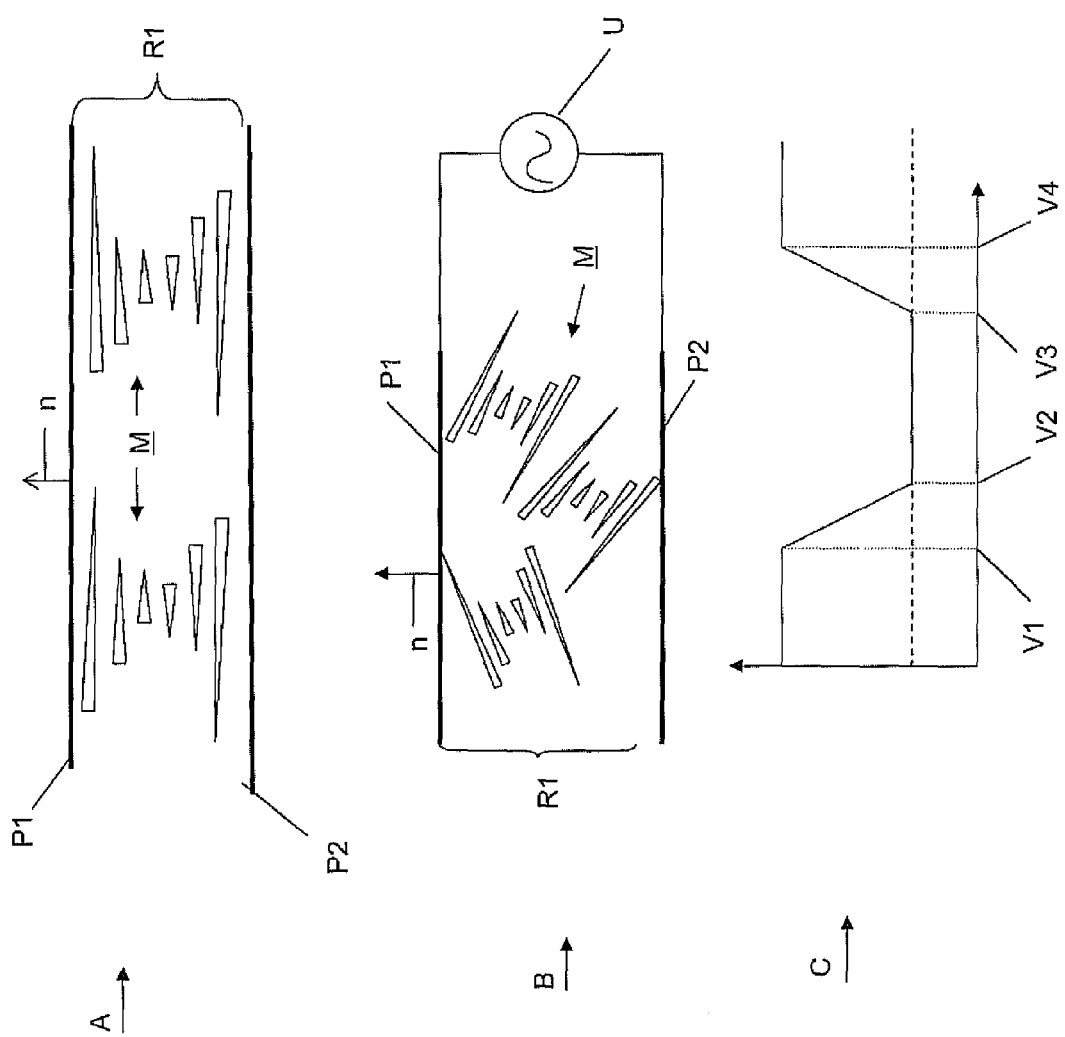
FIG. 1 presents an embodiment of a CLC material suitable for use in a stack display according to the invention.

FIG. 1 presents an embodiment of a CLC material suitable for use in a stack color display according to an embodiment of the invention. A CLC color display may be based on chiral nematic CLC molecules confined between two parallel portions of a substrate (P1, P2) for defining a region (R1). By suitable substrate surface treatment, two liquid crystal phases exist (A, B) that may be stable at or near to room temperature. In absence of external electric field a planar phase (view A) may be enabled which comprise liquid crystal molecules (M) forming a helical structure with the helical axes lying predominantly parallel to the surface normal (n).

Application of a voltage pulse U to the region R1 can cause the cholesteric material to switch to the focal-conic texture. Here, the CLC structure may comprise small polydomain regions typically 10 μm wide. Within each domain there is planar structure, but the overall helix of each domain region is randomly oriented. A random distribution of helical axes causes incident light to be weakly scattered in all directions.

In a homogeneously aligned CLC region, the focal-conic texture of a cholesteric material is only meso-stable and may degrade back to the homogeneous planar texture over a period of several seconds. In order to stabilise the focal conic texture, two techniques can be employed; polymer stabilisation and/or surface stabilisation. Polymer stabilisation utilises a polymer network throughout the cholesteric material in order to generate polymer-wall: CLC molecular interactions that stabilise the focal conic texture. Surface stabilisation utilises a surface alignment material on both sides of the cell in order to produce LC molecular anchoring interactions that stabilise the focal conic texture.

In correspondence with the Bragg principle, when illuminated with light, the planar texture reflects light having a specific wavelength that satisfies the equation l=$\underline{n}$.p, where $\underline{n}$ is the average refractive index of the CLC material and p is the pitch of the helical structure. The bandwidth of reflected light from the planar texture is given by Dl=Dn.p, where Dn is the anisotropic index of refraction of the CLC material. It is found that light which is circularly polarised with the same sense of rotation as that of the twisting helical structure of the planar texture is reflected; light circularly polarised in the opposite sense may pass through the material unaffected. If the peak wavelength of the Bragg reflection from the planar texture of a CLC display lies in the visible spectrum, the planar texture may appear highly coloured. It is therefore the chemical nature of the CLC material that may determine the helical pitch, and hence the colour of the display.

On the contrary, a focal conic texture weakly scatters light in a forward direction, therefore is predominantly transparent in appearance. By painting the back of the display with a black mask, the focal conic texture may therefore appear black. The use of a passive matrix driving scheme may therefore enable a monochrome, bistable CLC display to be formed where the CLC material at each individual pixel can be alternated between either the focal conic (black) or planar (coloured) textures thereby being alternated between a color state and a substantially transparent state.

CLC displays may require a polariser, back-lighting or active matrix substrates. The use of the passive matrix driving scheme also makes this technology particularly suitable for large area applications. Different monochrome colours may be obtained by changing the chemical nature of the CLC material. In order to obtain full colour, several liquid crystal cells may be stacked on top of each other by bending a substrate comprising such regions in accordance with the invention, wherein each region has one of the three primary colours. The passive matrix driving scheme may also ensure that the largest possible aspect ratio is achieved, hence maximising the total reflectance of the display. By illuminating the display with incident light that is circularly polarised in the same sense of rotation as the twisting helical structure of the planar texture, reflectances approaching 100% can be obtained over a specific range of wavelengths.

The reflective colour of the perfect planar texture may be sensitive to viewing angle. The substrate surfaces in a CLC display may be treated so that a fractured planar texture is formed. Here, a poly-domain structure may be obtained. Within each domain, the CLC material may be in substantially planar texture where the helical axes may be aligned in the same orientation. However, the orientation of each domain may be randomly distributed around the surface normal of the CLC display. The net result may be an averaging effect where the overall colour of the display is predominantly independent of viewing angle, although the total normal reflectance of the display is somewhat reduced to below typically 40% for incident unpolarised light.

Due to the bi-stability of the CLC material, no power is required to maintain an image. An image may therefore remain on the display for a substantially period of time, for example, years, until a new image may be scanned into the display. Power is required only when the display is to be updated.

However, the switching mechanism of CLC displays is relatively slow and typical frame update times using standard passive matrix drive techniques lie in the region of 10 ms per row. For a ¼ VGA display (320*240 pixels), this gives a frame update time of 2.4 seconds. The dynamic driving scheme, described in Huang et. al., *SID 95 DIGEST*, pg 347-350, uses elaborate waveforms to obtain frame updating speeds approaching 1.0 ms per row. However, a preparation and evolution voltage pulse may also be required, giving a total frame update time of 0.36 seconds for a ¼ VGA display, corresponding to an update frequency of 2.8 Hz.

Although the addressing speed of the dynamic driving scheme is faster than 1.0 ms per row, the cholesteric material usually has to spend more than typically 50 ms in the addressing phases during which the material does not reflect light. The dynamic driving schemes are therefore not particularly suitable for video rate operation where the content of the display is to be updated frequently.

However, the cumulative driving scheme, as described in Zhu & Yang, *SID 98 DIGEST*, pg 798-801, switches the cholesteric material to either the focal conic or planar texture gradually by successive multiple voltage pulses. In each addressing frame, the LC material spends only a short period of time in the addressing phase where the voltage pulse is applied. No preparation or evolution pulses are required and addressing speeds of 0.5 ms per row can be achieved, giving a frame update of 0.12 seconds for a ¼ VGA display. This corresponds to an update frequency of 8 Hz. Interlacing techniques can increase this figure further by a factor two, reaching an update frequency of 16 Hz. The CLC display can therefore be operated at quasi-video rate.

View C presents schematically a possible driving scheme for controlling a cell R1. The magnitude of the voltage pulse required in order to switch between the planar & focal conic textures depends upon the intrinsic parameters of the cholesteric material. Intrinsic parameters such as viscosity & dielectric anisotropy affect the switching voltages for the cholesteric material. Specifically, a low viscosity and a high dielectric anisotropy reduces the driving voltages $V_3$ & $V_4$.

Following drive schemes may be envisaged:
i) $V > V_4 \Rightarrow$ Planar texture, color appearance.
ii) $V_2 < V < V_3 \Rightarrow$ Focal conic, transparent appearance
iii) $V < V_1 \Rightarrow$ no change ($V_1$ is the threshold voltage)
iv) $V_3 < V < V_4 \Rightarrow$ Grey scale.

The planar texture is highly coloured in reflection, whilst the focal conic texture appears black when the back-plane of the LCD is coated with a black-mask. Both textures are stable without an externally applied field being present (bistability) and switching between the two textures occurs via application of a suitable voltage pulse.

Figure 2:
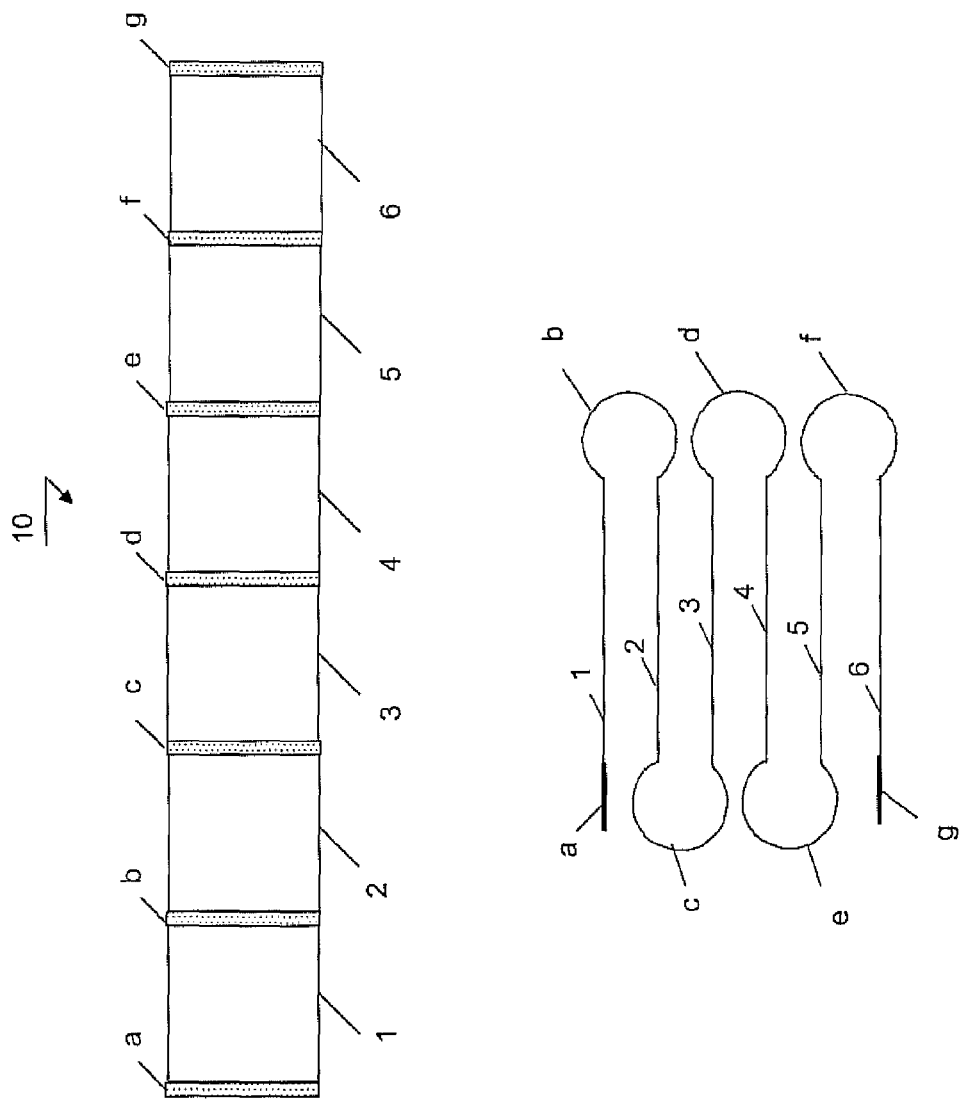
FIG. 2 presents a schematic view of an embodiment of the stack CLC stack display according to the invention.

FIG. 2 presents a schematic view of an embodiment of the stack CLC color display according to the invention, although this embodiment is applicable to other display technologies. Above, a top view of a substrate 10 is shown. In accordance with an embodiment of the invention, the substrate 10 comprises a sequence of portions 1-6 which are conceived to be used to form regions having pre-defined color. Preferably, primary colors are used, like red, green and blue. However, different colors may be used. Also, a different number of colors may be used. Each portion 1-6 is electrically connected to a further portion in the sequence by respective interconnect regions b-f, which are dimensioned to allow forming an oversized loop (see below) between the regions 1-2, 3-4 and 5-6 when the substrate is bent. The regions 1-2, 3-4 and 5-6 are filled with a suitable CLC material for enabling due color. As a result, a display is formed wherein a stack of colored layers is formed, each layer extending over the total active area of the display. A number of areas to be optically and mechanically matched is reduced, as said matching has to occur on a macro level (i.e. color layers) and not on the micro level (i.e. pixels). In case the CLC color display is operating using an active matrix driving scheme, the portions 1, 3, 5 may relate to the active matrix backplanes, whereas the portions 2, 4, 6 may relate to the common planes. Typically, a thickness of the CLC color layer is about 4 microns thick, while a thickness of the substrate is about 25 microns. A diameter of the loop b-f may be as large as 4 mm. Interconnect layers "a" and "g" may be used for enabling electrical connectivity of the display to the outside world and they may be likewise bent or be kept substantially flat.

Figure 3:
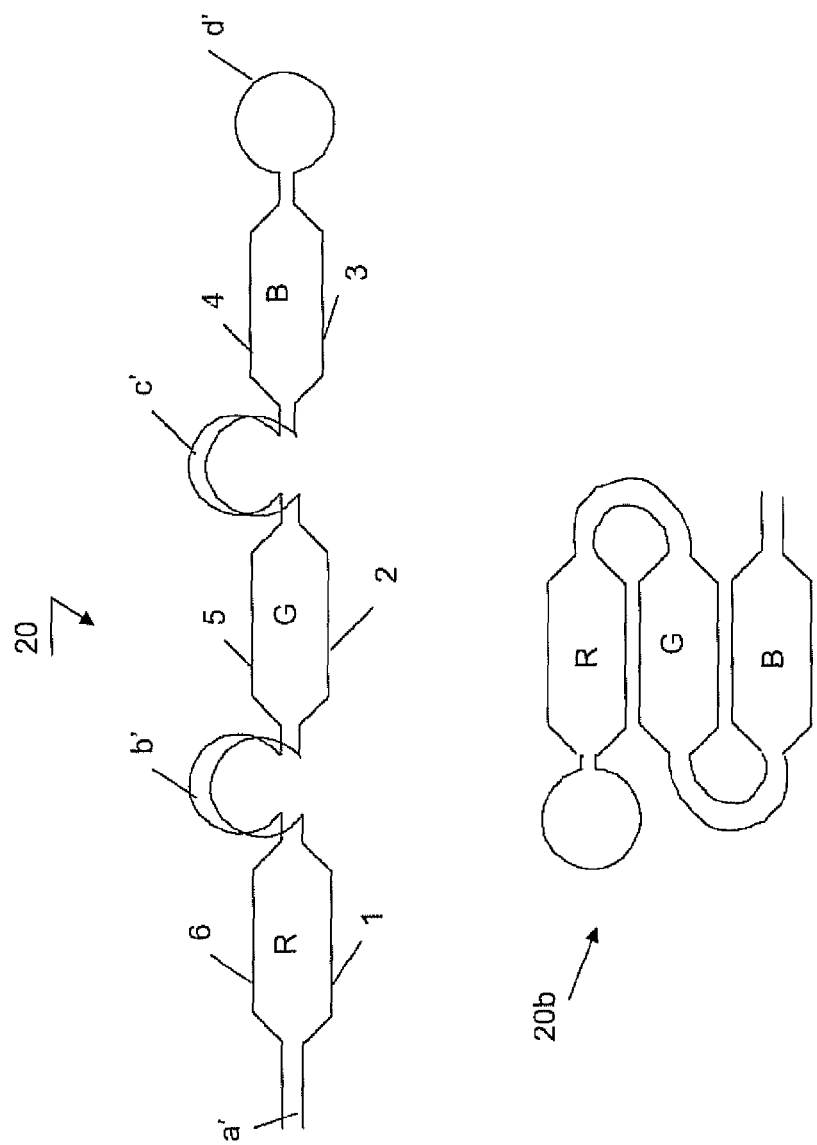
FIG. 3 presents a schematic view of a further embodiment of the stack CLC display according to the invention with pre-fabricated cells.

FIG. 3 presents a schematic view of a further embodiment of the stack CLC color display according to the invention, wherein pre-fabricated cells are used. It will be appreciated that this embodiment is also applicable for use with other display technologies. In this embodiment in the upper view a bended substrate 20 is shown, wherein regions 1-6, 5-2 and 3-4 are formed as cells. The cells may be filled with a suitable CLC material for enabling suitable color, like red-green-blue prior to forming the display 20*b*. Also in this embodiment, the portions 1, 2, 3 may relate to the active matrix and the portions 6, 5, 4 may relate to the common planes. The loops b', c' and d' are formed and dimensioned for allowing due bending of the substrate 20 to yield a stack of the colored layers R-G-B as is shown in view 20*b*. Interconnect a' may be used for electrically connecting the display 20*b* to the outside world.

Figure 4:
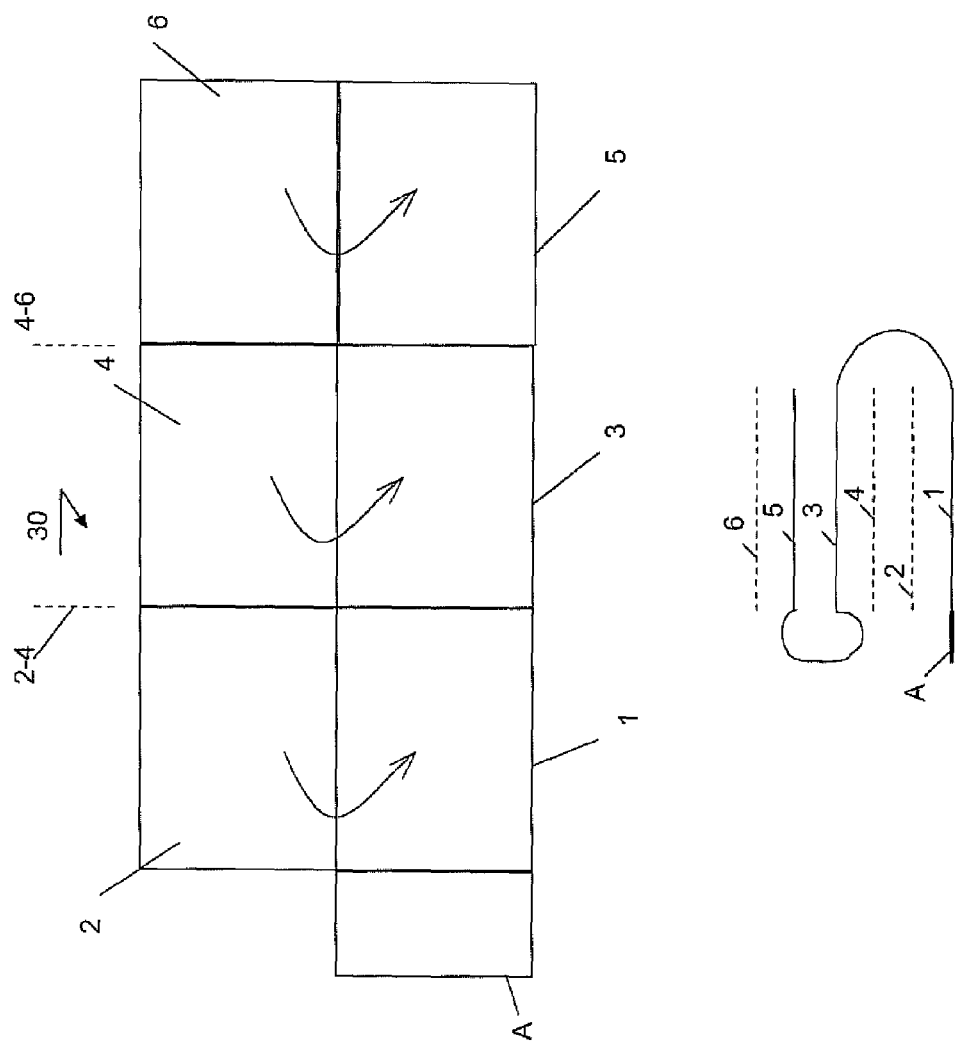
FIG. 4 presents a schematic view of a further embodiment of a substrate bending.

FIG. 4 presents a schematic view of a further embodiment of a substrate bending. FIG. 4 shows a further embodiment of the substrate 30 to be used to form a display comprising a stack of suitable colors. In this embodiment, the substrate 30 comprises portions 1, 2, 3, 4, 5, 6, whereby the substrate is conceived to be cut along the lines 2-4 and 4-6 for separating the portions 2, 4 and 6 from each other. The portions 1, 3, 5 may stay together. The portion A is used for enabling electrical connectivity to the substrate. In the view below a resulting display comprising the folded substrate 30 is shown. The shown pattern results from first bending the portions 2, 4 and 6 and then by snake-folding the portions 1, 3 and 5. In this case the substrate 30 is bent in two substantially orthogonal planes, wherein loops connecting portions 1-2 and 3-4 (not shown) extends from the plane of the drawing. The advantage of this embodiment is that a layout of the portions 1-6 may be rectangular, making it possible to have a more efficient packing of the portions 1-6 for producing multiple displays on a large panel. Also here a cell making and filling may be done prior to stacking.

It will be appreciated that this embodiment comprises elements 2, 4, 6 being folded over elements 1, 3, 5 in order to make the three display regions 1-2, 3-4 and 5-6. These parts can then be stacked on top of each other by attaching the backsides of 1m3 and 4,6 to each other (not shown) or by attaching the backsides of 2,3 and 3,5 to each other, as is shown in the bottom portion of FIG. 4. In the latter case the loop between 5,6 in the bottom portion of FIG. 4 will not be in the plane of the drawing. In both cases the active-matrix (Am) and common electrode (ce) electronic structures may be processed on the top side of the substrate.

It will be appreciated that such stacked display is suitable to be implemented as a rollable display. In this case, loops which may be oriented transverse, for example, perpendicular to a rolling direction may be implemented to extend partially over a cross-section of the substrate for preventing obstructing to rolling. For example, such interconnecting regions may be implemented as one or more thin bridges between the portions of the substrate. Such arrangement may enable smooth rolling of the stack display without inducing damage to the interconnect regions.

Figure 5:
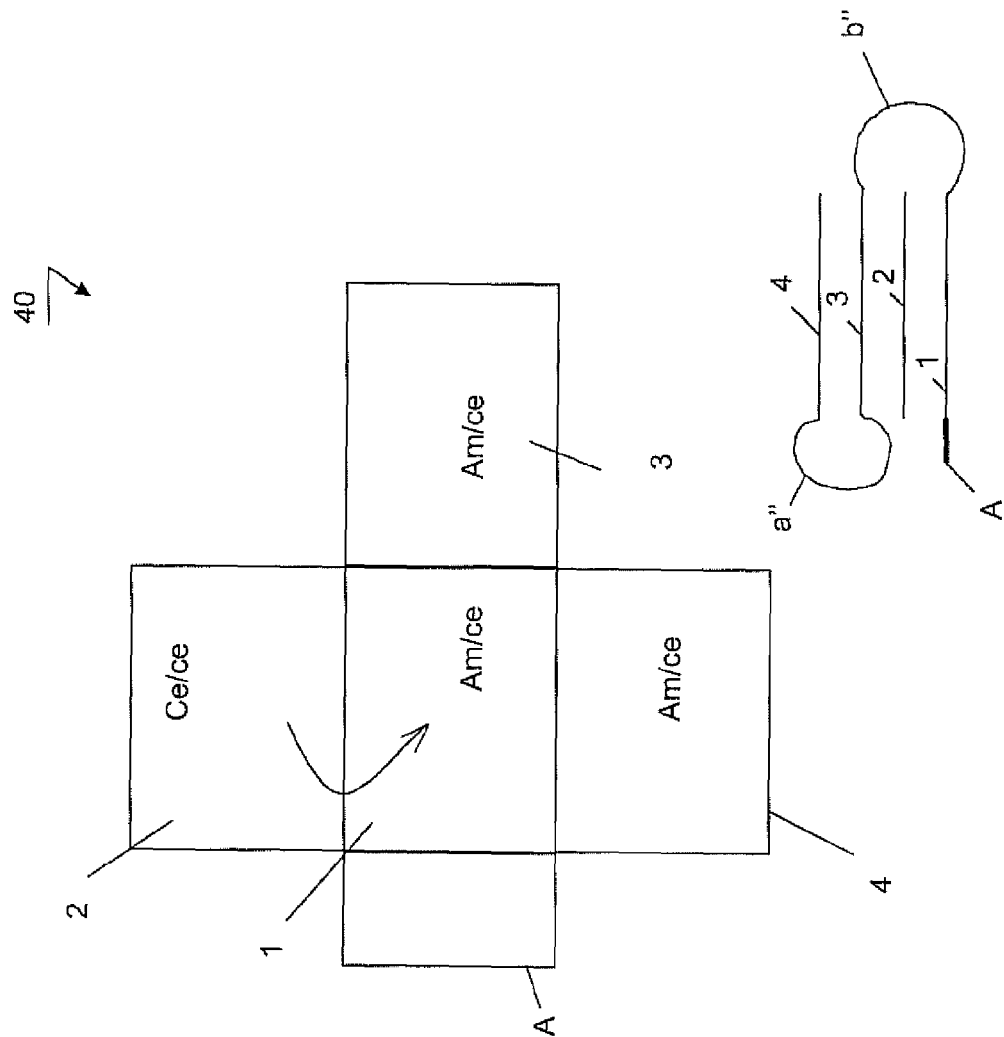
FIG. 5 presents a schematic view of a still further embodiment of a substrate bending.

FIG. 5 presents a schematic view of a still further embodiment of a substrate bending. In this embodiment of the invention, the substrate 40 comprises four portions 1, 2, 3, 4, wherein some portions forming a region to be filled with the CLC material comprises a mixed common electrode (ce) with an active matrix electrode (Am). Below a corresponding display stack structure is shown, wherein first the portions 1 and 2 are flapped after which the portions 1-3-4 are snake-folded, The loops a'' and b'' are oversized as discussed with the previous embodiments, wherein the portion A may be used for purposes of electrical connectivity. This embodiment may be produced by coating a backside of a suitable substrate, like a foil with a conductive material that can be used as the common electrode (ce) material before or after processing of the front side. A backplane material of elements 1 and 4 may not have a function for the display operation. This embodiment has an advantage that an efficient use of substrate area is achieved when processing multiple displays on one big plate. This embodiment may require a double sided processing of the substrate. However, as the bottom side is fully covered with an unpatterned ce electrode, such processing may be carried out on a plastic roll before the actual display processing commences. The top side may need to be processed with the Am stack.

Figure 6:
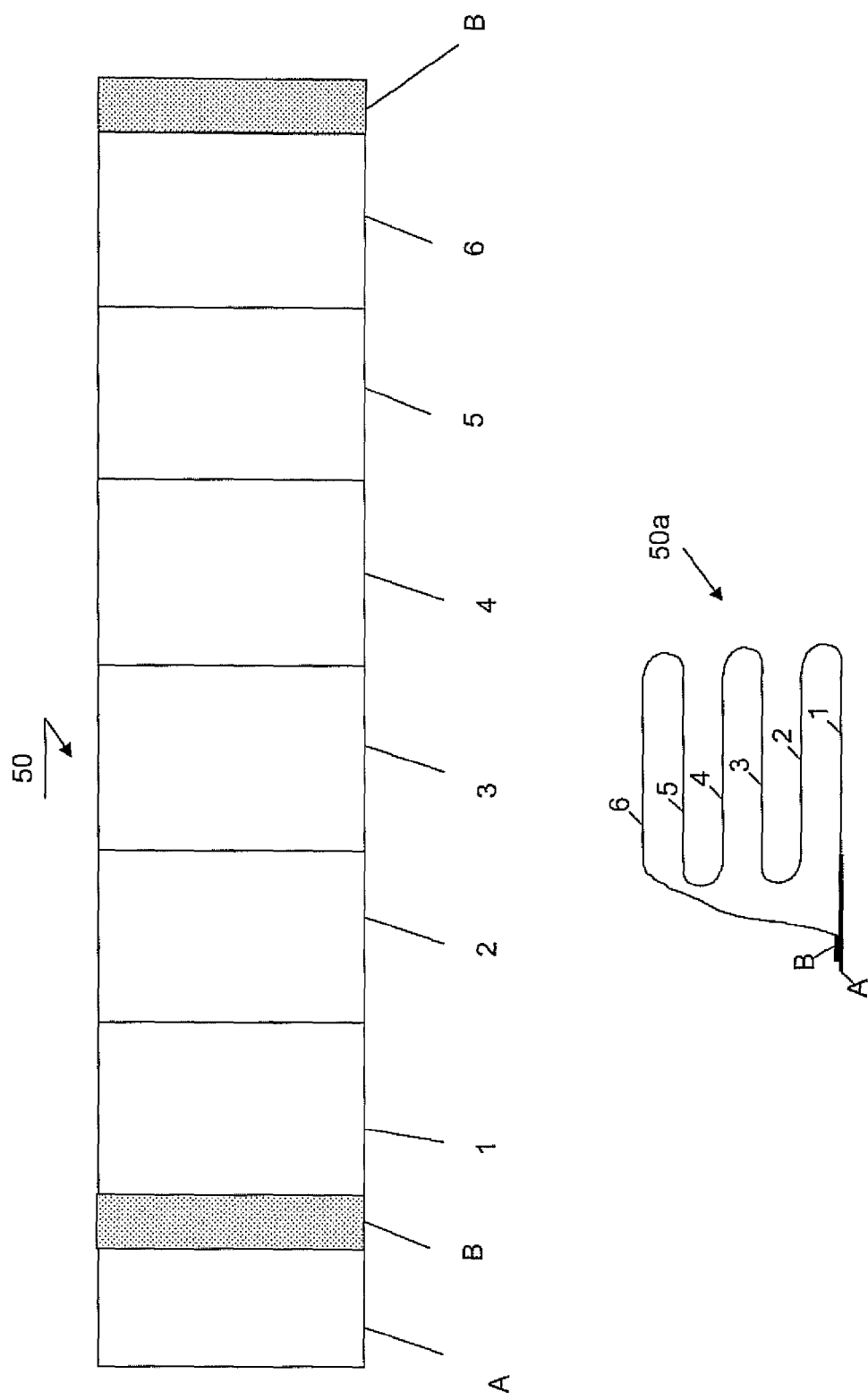
FIG. 6 presents a schematic view of a still further embodiment of a substrate bending.

FIG. 6 presents a schematic view of a still further embodiment of a substrate bending. This embodiment illustrates a possible easy way for connecting the display 50 to the outside world. In this embodiment, after the substrate 50 has been stacked for providing a display 50a, the portions A and B are electrically interconnected. Both elements B may comprise driver chips. Element A may be formed as a sole interface to the outside world, making the electrical connectivity simple, reliable and identical to the way a traditional, non-stacked display s connected.

Figure 7:
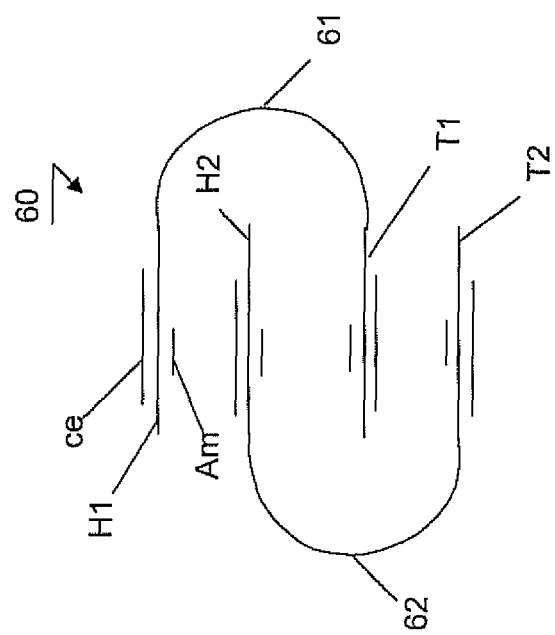
FIG. 7 presents a schematic view of an embodiment using two interleaved bended substrates.

FIG. 7 presents a schematic view of an embodiment using two interleaved bended substrates. This embodiment shows an alternative display stack wherein two bended substrates 61 and 62, having respective head portions H1, H2 and trailing portions T1, T2 are used. In this case a trailing portion T1 of bended substrate 61 is received by bended substrate 62 so that these substrates are interleaved forming respective regions to be filled with CLC material. The regions are thus formed by overlapping portions of the interleaved substrates 61, 62. Each head or trailing end comprises a common electrode (ce) and an active matrix electrode (Am). This embodiment reduces interconnect problem by having only interconnect to the loop and the bottom element instead of having interconnect to all elements individually, or at least to three elements, as is used in the prior art.

Figure 8:
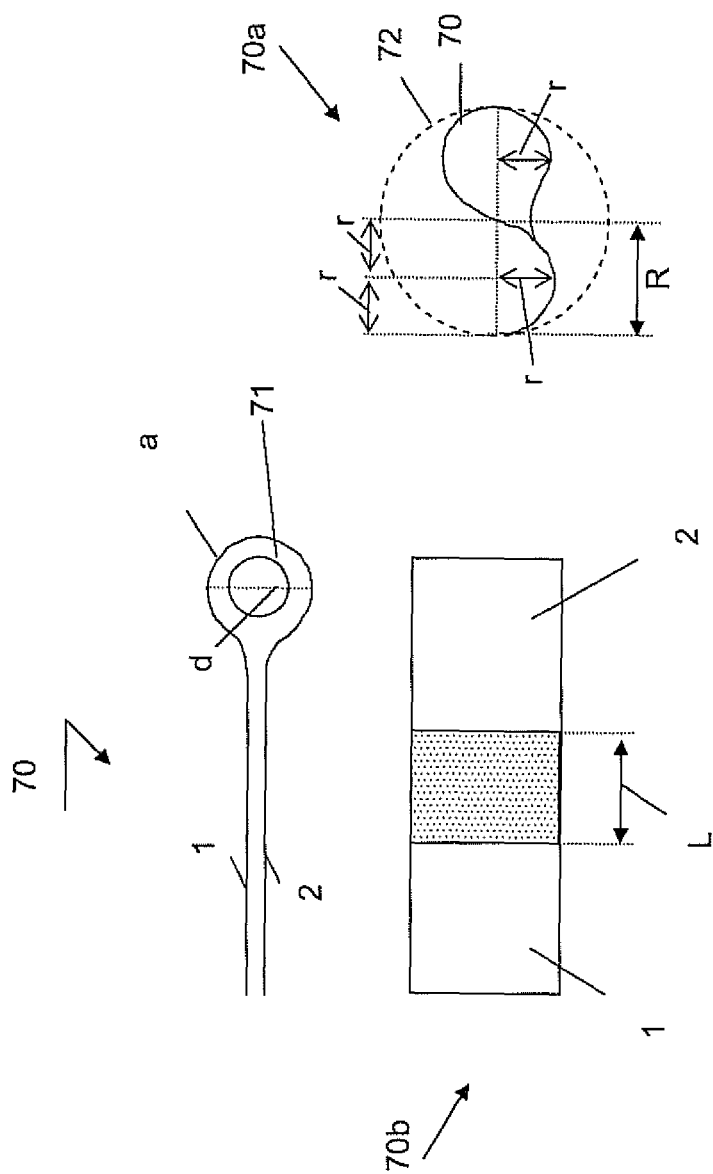
FIG. 8 presents a schematic view of an embodiment of a loop.

FIG. 8 presents a schematic view of an embodiment of a loop. The loop 70 may be formed between a portion 1 and 2, as is discussed with reference to FIG. 2. Provided the loop is formed with a radius of 2 mm, a distance L between portions forming the loop (see view 70b) may be calculated according to the formula: $L=7/3\pi r=14.7$ mm. Although usually in a stack the loops will be positioned substantially on top of each other, it is also possible to stack them laterally with respect to each other. In addition, the loop 70 may be provided with a suitable stiffener 71 for preventing the loop from collapsing. This feature improves durability of the electrode layer running in the loop.

In view 70a a loop 70 housed in a roller 72 is shown. This feature is of particular advantage for a rollable flexible display. Preferably, the loop 70 is housed in a roll cylinder. In order to enable a damage-free rolling of a display provided with a loop, a radius of the cylinder R has to be at least two times larger than the radius r of the loop. Preferably, R=2r.

Figure 9:
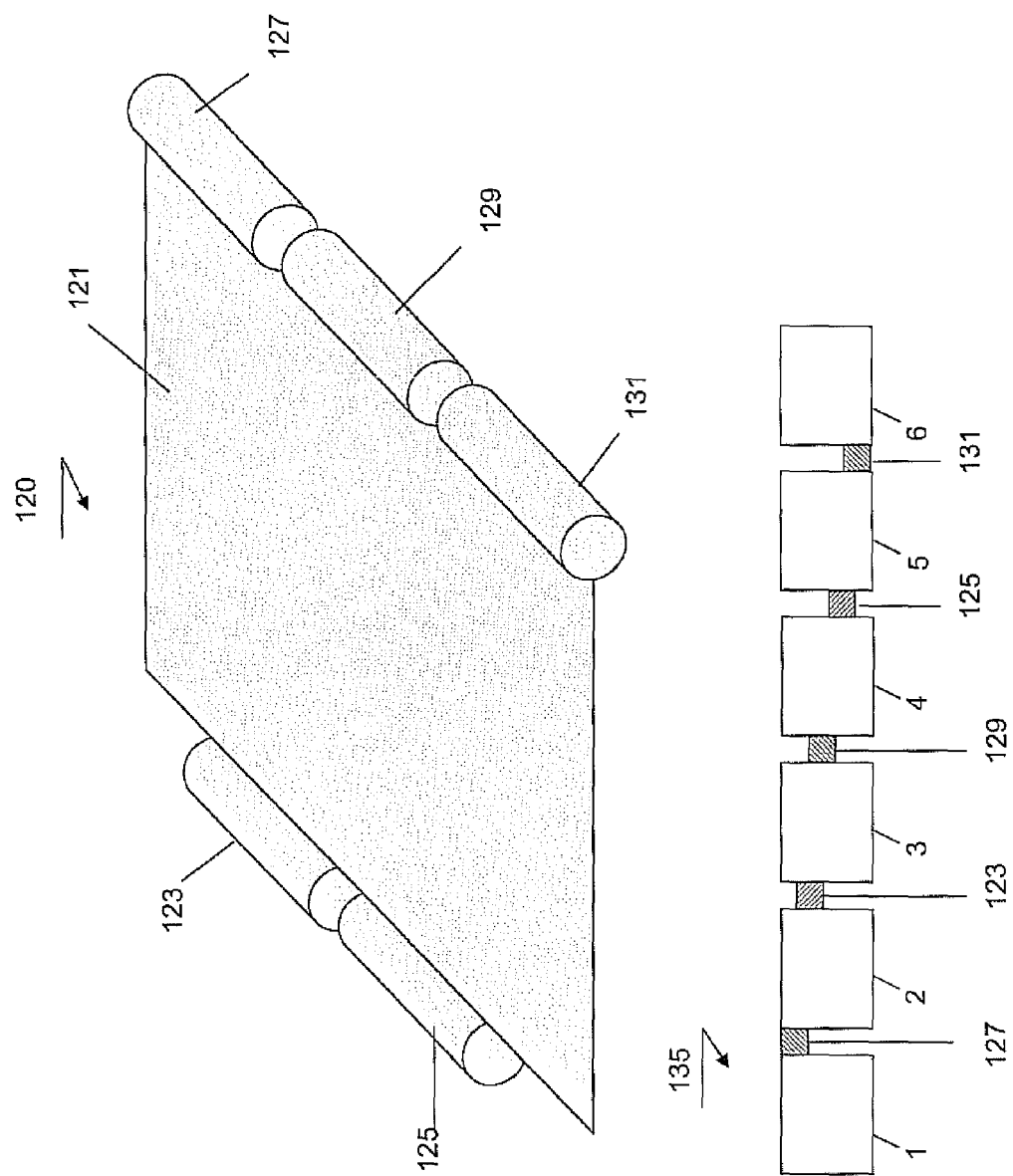
FIG. 9 present a schematic view of an embodiment of loop stacking.

FIG. 9 present a schematic view of an embodiment of loop stacking. A stack 120 comprises a suitable number of superposed regions 121, for example, as discussed with reference to FIG. 2. The loops 123, 125, 127, 129, 131 connecting respective portions (nor shown) forming said regions are laterally arranged with respect to the regions 121 so that individual loops 123, 125, 127, 129, 131 do not spatially interfere with each other. A typical radius of a loop which can be achieved with this embodiment is about 2 mm. In order to implement such stacking each loop takes a portion of a substrate width so than in a stacked condition individual loops formed on each side of the stack are sequentially arranged. View 135 presents a schematic embodiment of a substrate suitable for implementing this embodiment.

Figure 10:
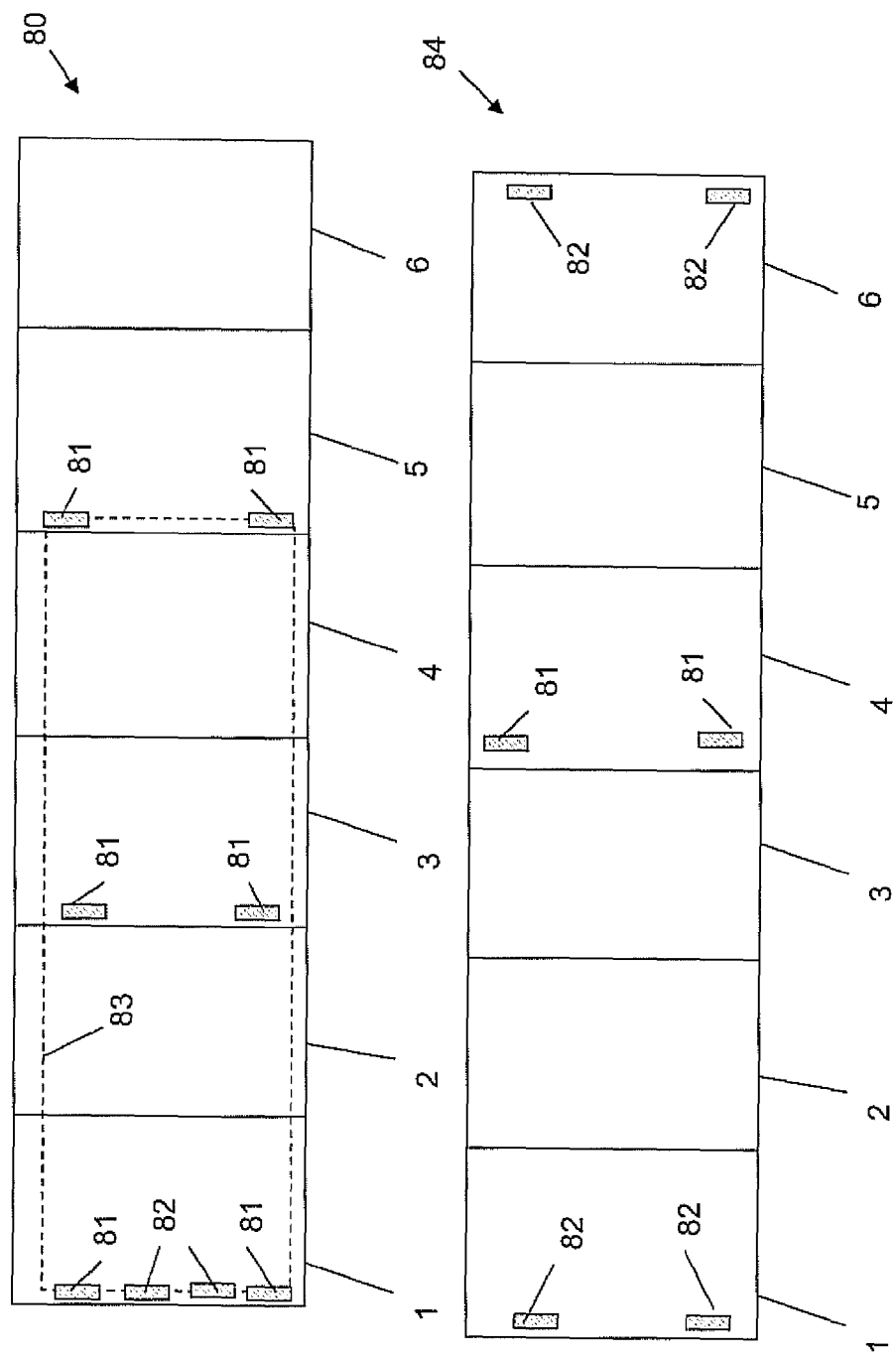
FIG. 10 presents a schematic view of an embodiment of a substrate provided with shared integrated circuits.

FIG. 10 presents a schematic view of an embodiment of a substrate provided with shared integrated circuits. In this embodiment different interconnect possibilities are schematically depicted. In the above drawing, a substrate 80 is provided with six portions 1-6, as, for example, discussed with reference to FIG. 2. The portions 1-5 are interconnected using leads 83 to integrated circuits (IC). Portions 1, 3 and 5 are provided with a couple of column IC's 81, whereas portion 1 may be also provided with a couple of row IC's 82. As all portions 1-6 are interconnected an advantage is that interconnect of the stacked display to the outside world becomes easier. The row IC's 82 can be shared between the portions 1-6, whereby every active matrix may require a separate set of column driver IC's 81. All control lines 83 to the column driver ICs can be routed to portions 1-6, for example where a flexible portion conceived to be bent is located. It is also possible to share column IC's 81 and to have separate sets of row IC's 82. Alternatively, it is also possible to share both row ICs 82 and the column ICs 81.

A view below schematically depicts an alternative configuration 84 wherein two sets of row driving ICs 82 at portions 1 and 6 are located and wherein only one set of column ICs 81 of all elements 1-6 is positioned in the middle element 3. This embodiment has an advantage that an amount of interconnect lines to the drivers is reduced. The driver control signals may be routed to portion 1 and/or to portion 6.

Figure 11:
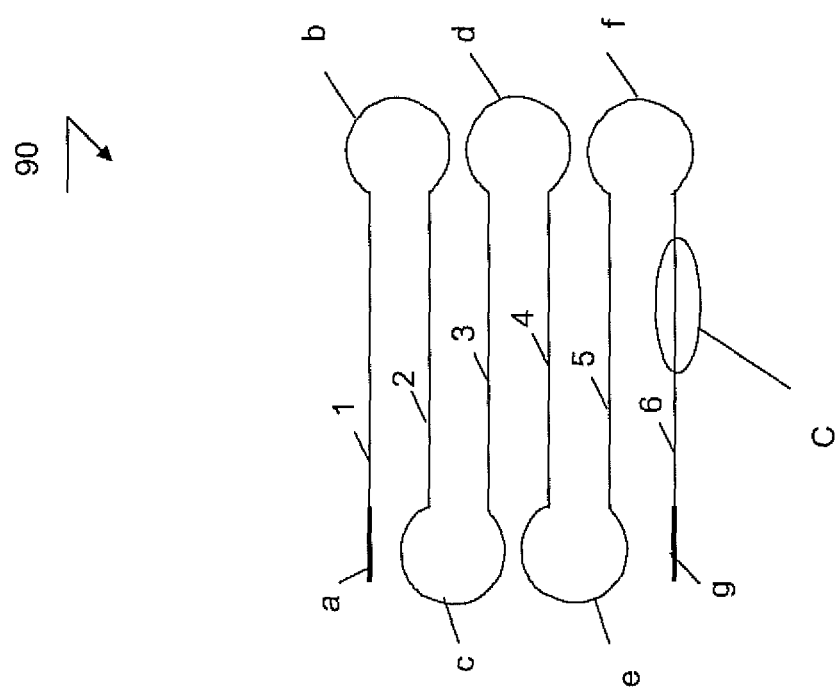
FIG. 11 presents a further embodiment of a substrate provided with regions having mixed active-matrix and common electrode elements.

FIG. 11 presents a further embodiment of a substrate provided with regions having mixed active-matrix and common electrode elements. The substrate 90 may be arranged as is discussed with reference to FIG. 2. An area C on a portion 6 conceived to form a region to be filled by a CLC material may be patterned as shown in enlarged section C. It is seen that the area of the portion of the display may have a mix between active matrix and common electrode. For example, the active matrix electrodes 91 may be positioned diagonally. The remaining area may be used for arranging common electrodes 92. Alternatively, active matrix electrodes 91 may be arranged in columns which may be alternated by columns formed by common electrodes 92. These embodiments have an advantage that TFT density per portion 1-6 is reduced and all portions 1-6 are equal. In addition, cross-talk between portions is avoided and a substantial increase of an aperture is obtained as all electrodes may be routed on top of each other. When active matrix pixels are positioned on all elements this results in a substantial reduction of a voltage swing on the display, as the bottom and the top electrodes are actively controlled per pixel.

This embodiment has an advantage in reducing cross-talk as the active elements on each substrate have a factor of 2 lower density. The active elements are normally influencing each other by electrical cross-talk. As the density is reduced by a factor of two the electrical crosstalk is reduced.

In addition, a higher aperture can be reached when the lower active-matrix pixel density on the substrates is used to route the row and column electrodes that are present on both the bottom and the top substrate on top of each other. In the layout known from the prior art such arrangement is not possible, as all active-matrix pixels are positioned only on the bottom (or top) substrate.

Figure 12:
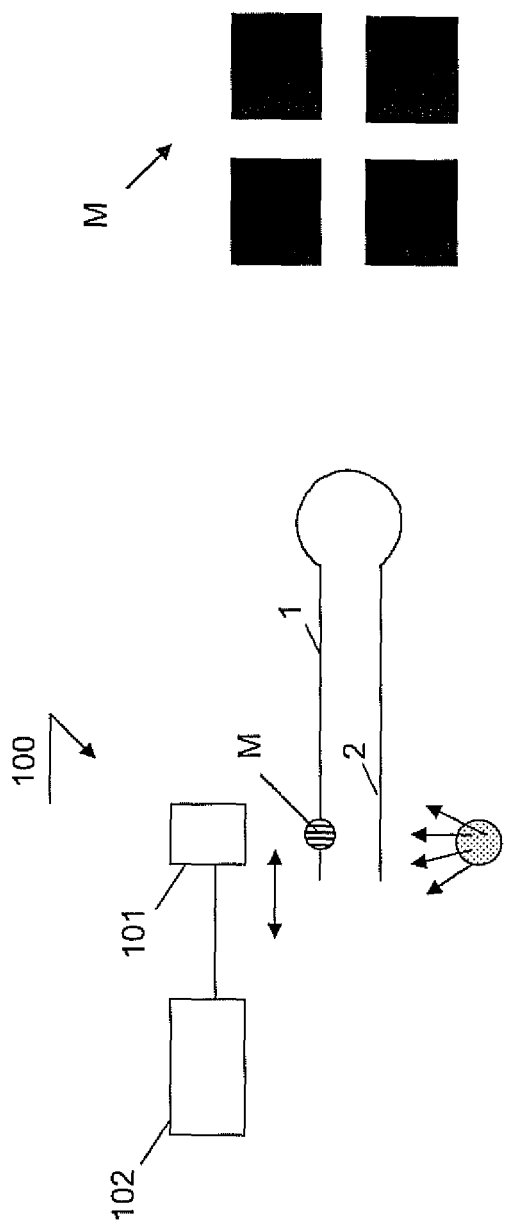
FIG. 12 presents an embodiment of a region provided with an alignment marker.

FIG. 12 presents an embodiment of a region provided with an alignment marker. A part of a display stack as is discussed with reference to FIG. 2 is shown, wherein a portion 1 is provided with an alignment marker M. The alignment marker may be arranged as a radiation transmission marker, for example as a suitable black/white pattern. During the step of aligning the portion 1 with respect to the portion 2 a suitable radiation source may be positioned below the portions 1-2 an a transmission image or a transmission data may be collected by a suitable detector 101 positioned post portion 1. The detector 101 may be connected to a suitable control system 102 for controlling a relative displacement between the portions 1 and 2 for achieving due alignment there between. The marker M may comprise a white cross on a black background, however other patterns are possible. Preferably, each portion 1-6 of the substrate comprises at least one such alignment marker leading to increased radiation transmission for a due alignment. This feature increases overall alignment accuracy.

It will be appreciated that although specific embodiments of the color display according to the invention are discussed separately for clarity purposes, interchangeability of compatible features discussed with reference to isolated figures is envisaged. While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. A display, comprising:
   a first substrate comprising a first head portion and a first trailing portion; and
   a second substrate comprising a second head portion and a second trailing portion;
   wherein the first and second substrates are bent and interleaved such that the second head portion is sandwiched between the first head portion and the first trailing portion, and the first trailing portion is sandwiched between the second head portion and the second trailing portion;
   wherein overlapped portions of the first and second substrates form a plurality of superposed regions; and
   wherein the superposed regions are configured to be alternated between at least a first substantially reflective color state and a second substantially transparent state.

2. The display according to claim 1 wherein the display uses a display technology from the set consisting of: a cholesteric liquid crystal (CLC) display, an electrowetting display, an OLED display, and LCD display or a combination thereof.

3. The display according to claim 1, wherein the display uses an electrowetting display technology, and the first substantially reflective color state is alternated with the second substantially transparent state using electrowetting.

4. The display according to claim 1, the display being operable as an active matrix display, wherein the first and second substrates comprise a sequence of an active matrix backplane followed by a common backplane.

5. The display according to claim 4, wherein integrated circuits (IC's) of an active matrix for driving display pixels are shared between the superposed regions.

6. The display according to claim 1, wherein said superposed regions comprise respective cells filled with a corresponding pre-defined display effect material.

7. The display according to claim 6, wherein the cells are fabricated prior to bending of the first and second substrates.

8. The display according to claim 1, wherein the first substrate and the second substrate are spaced apart with each other.

9. The display according to claim 1, wherein the display is flexible.

10. The display according to claim 9, wherein the display is rollable.

11. The display according to claim 9, wherein either a leading portion of the display or the trailing portion of the display, or both, are stiffened.

12. The display according to claim 1, wherein the first and second substrates comprise markers for enabling alignment of the superposed regions having the pre-defined display effect.

13. The display according to claim 12, wherein each said superposed region comprises at least one said marker.

14. The display according to claim 1, wherein a backplane of said superposed regions comprises mixed active matrix and common plane electrodes.

15. An electronic apparatus comprising a display according to claim 1.

16. The display according to claim 1, wherein each of the first and second head portions and the first and second trailing portions comprises a common electrode and an active matrix electrode.

17. A method for manufacturing a stacked display comprising the steps of:
providing a first substrate comprising a first head portion and a first trailing portion; and
providing a second substrate comprising a second head portion and a second trailing portion; and
bending and interleaving the first and second substrates such that the second head portion is sandwiched between the first head portion and the first trailing portion, and the first trailing portion is sandwiched between the second head portion and the second trailing portion, such that overlapped portions of the first and second substrates form a plurality of superposed regions;
wherein the superposed regions are configured to be alternated between at least a first substantially reflective color state and a second substantially transparent state.

18. The method according to claim 17, further comprising the step of filling the overlapped portions with a suitable display effect material for forming said superposed regions.

19. The method according to claim 17, wherein prior to bending the substrate the portions are arranged to form cells comprising a pre-defined display effect material.

20. The method according to claim 19, wherein the cells are filled with a material taken from the set materials consisting of: a CLC material, an electrowetting-operable material enabling a controllable color effect, an OLED material, and an LCD material.

21. The method according to claim 19, wherein the cells are filled with a material taken from the set materials consisting of an electrowetting-operable material enabling a controllable color effect, and electrowetting is used for alternating between the first substantially reflective color state and the second substantially transparent state.

22. The method according to claim 17, wherein the first and second substrates are at least partially cut prior to bending.

23. The method according to claim 17, wherein the first substrate and second substrate are spaced apart from each other after the steps of bending and interleaving.

24. The method according to claim 17, wherein the thus formed stacked display is flexible.

25. The method according to claim 17, further comprising the step of stiffening a leading and/or a trailing portion of the flexible display.

26. The method according to claim 17, further comprising the step of providing the first and second substrates with alignment markers for enabling alignment between the superposed regions having a pre-defined display effect.

27. The method according to claim 26, wherein each said superposed region is provided with at least one said marker.

28. The method according to claim 26, wherein said marker is used as a radiation transmission marker during an alignment step.

29. The method according to claim 17, wherein the stacked display comprises an active drive matrix, the method comprising the step of arranging said superposed regions with mixed active-matrix and common electrode elements.

30. The method according to claim 17, wherein each of the first and second head portions and the first and second trailing portions comprises a common electrode and an active matrix electrode.

* * * * *